US012091638B2

(12) United States Patent
Sun et al.

(10) Patent No.: US 12,091,638 B2
(45) Date of Patent: Sep. 17, 2024

(54) ONE-PIECE WASHING TABLET MADE FROM COMBINATION OF COMPOSITIONS AND PREPARATION METHOD THEREOF

(71) Applicant: Guangzhou Joyson Cleaning Products Co., Ltd., Guangzhou (CN)

(72) Inventors: Jianfeng Sun, Guangzhou (CN); Fenglei Li, Guangzhou (CN); Min Sun, Guangzhou (CN); Xiangjian Zeng, Guangzhou (CN); Na Lan, Guangzhou (CN); Yumei Huang, Guangzhou (CN)

( * ) Notice: Subject to any disclaimer, the term of this patent is extended or adjusted under 35 U.S.C. 154(b) by 0 days.

(21) Appl. No.: 18/422,094

(22) Filed: Jan. 25, 2024

(65) Prior Publication Data
US 2024/0228915 A1 Jul. 11, 2024

(30) Foreign Application Priority Data

Nov. 25, 2022 (CN) .......................... 202211492081.2

(51) Int. Cl.
| | |
|---|---|
| *C11D 17/00* | (2006.01) |
| *C11D 1/29* | (2006.01) |
| *C11D 1/48* | (2006.01) |
| *C11D 1/62* | (2006.01) |
| *C11D 1/722* | (2006.01) |
| *C11D 1/831* | (2006.01) |
| *C11D 1/86* | (2006.01) |
| *C11D 1/90* | (2006.01) |
| *C11D 1/94* | (2006.01) |
| *C11D 3/00* | (2006.01) |
| *C11D 3/12* | (2006.01) |
| *C11D 3/20* | (2006.01) |
| *C11D 3/22* | (2006.01) |
| *C11D 3/30* | (2006.01) |
| *C11D 3/37* | (2006.01) |
| *C11D 3/40* | (2006.01) |
| *C11D 3/48* | (2006.01) |

(52) U.S. Cl.
CPC ............ *C11D 17/0047* (2013.01); *C11D 1/29* (2013.01); *C11D 1/62* (2013.01); *C11D 1/722* (2013.01); *C11D 1/831* (2013.01); *C11D 1/86* (2013.01); *C11D 1/90* (2013.01); *C11D 1/945* (2013.01); *C11D 3/0021* (2013.01); *C11D 3/0036* (2013.01); *C11D 3/128* (2013.01); *C11D 3/2065* (2013.01); *C11D 3/2082* (2013.01); *C11D 3/2093* (2013.01); *C11D 3/222* (2013.01); *C11D 3/30* (2013.01); *C11D 3/3753* (2013.01); *C11D 3/3776* (2013.01); *C11D 3/40* (2013.01); *C11D 3/48* (2013.01)

(58) Field of Classification Search
CPC ......... C11D 17/0047; C11D 1/29; C11D 1/62; C11D 1/722; C11D 1/831
See application file for complete search history.

(56) References Cited

U.S. PATENT DOCUMENTS

| | | | | | |
|---|---|---|---|---|---|
| 2,979,468 | A | * | 4/1961 | Auerbach | G01N 31/22 436/111 |
| 11,674,112 | B1 | * | 6/2023 | Sun | C11D 17/0078 510/446 |
| 2015/0203798 | A1 | * | 7/2015 | Miracle | C11D 3/2096 510/324 |
| 2016/0310561 | A1 | * | 10/2016 | Coulter | A61P 29/00 |
| 2017/0029474 | A1 | * | 2/2017 | Mekada | A61K 38/164 |
| 2017/0313962 | A1 | | 11/2017 | Shin | |
| 2019/0194584 | A1 | * | 6/2019 | Astete Boettcher | C11D 3/50 |
| 2023/0212480 | A1 | * | 7/2023 | Sun | C11D 3/3753 510/446 |

FOREIGN PATENT DOCUMENTS

| | | | | |
|---|---|---|---|---|
| CN | 104694275 A | | 6/2015 | |
| CN | 105586165 A | | 5/2016 | |
| CN | 106916659 A | * | 7/2017 | ............... C11D 1/83 |
| CN | 107312645 A | | 11/2017 | |
| CN | 113174297 A | | 7/2021 | |
| CN | 114250120 A | | 3/2022 | |
| CN | 114317140 A | | 4/2022 | |
| CN | 114395448 A | * | 4/2022 | ............... C02F 5/10 |
| CN | 114395450 A | | 4/2022 | |
| CN | 115216371 A | | 10/2022 | |
| CN | 115651781 B | * | 12/2023 | |
| CN | 114395450 B | * | 4/2024 | ............... C11D 1/83 |
| KR | 20120021449 A | | 3/2012 | |
| WO | 2020079178 A1 | | 4/2020 | |

* cited by examiner

*Primary Examiner* — Liam J Heincer
*Assistant Examiner* — M. Reza Asdjodi

(57) ABSTRACT

A one-piece combination detergent tablet is provided and includes: a detergent composition body A, a color-care and anti-stain composition body B, and an antibacterial and softening composition body C. The detergent composition body A includes: an anionic surfactant A, a non-ionic surfactant A, a polymeric water-soluble film A, an additive A, and water. The color-care and anti-stain composition body B includes: an anionic surfactant B; a non-ionic surfactant B; a polymeric water-soluble film B; an additive B; and water. The antibacterial and softening composition body C includes: a non-ionic surfactant C, a quaternary ammonium cationic surfactant, a polymeric water-soluble film C an additive C, and water. The one-piece combination detergent tablet can be stably stored and has an extended shelf life and a reduced transportation costs.

5 Claims, No Drawings

ONE-PIECE WASHING TABLET MADE FROM COMBINATION OF COMPOSITIONS AND PREPARATION METHOD THEREOF

CROSS REFERENCE TO RELATED APPLICATIONS

The present disclosure claims priority of Chinese patent application No. 202211492081.2, filed on Nov. 25, 2022, and contents of which are incorporated herein by its entireties.

TECHNICAL FIELD

The present disclosure relates to the field of washing, and in particular to a one-piece combination detergent tablet made from combination of various compositions and a method of preparing the detergent tablet.

BACKGROUND

As science and technology develops, people desires a better life, products for washing and cleaning have been changed dramatically from industrialized production, such as soap, laundry detergent, and laundry detergent liquid, to currently highly-promoted concentrated powder, liquid detergent products. As living standards have improved, people not only need detergent products for cleaning clothes, but also seek to take care of the clothes and personal hygiene. For example, people pay more attention to softness of clothes and anti-bacterial performance for the clothes.

In the art, detergents having anionic composition as the main composition and softening and caring agents having cationic composition are packaged separately from each other due to compatibility. When the detergents and the agents are to be used, the detergents and the agents need to be placed separately. When clothes are washed by hands, the clothes need to be soaked independently by the softening agent, and therefore, washing clothes takes a longer period of time. Therefore, in order to save washing time as much as possible and to enable the clothes to be washed more conveniently, the Chinese patent No. CN107849499A discloses a water-soluble unit-dosage product. The product is made by taking a water-soluble film to wrap detergents, and a space defined by the water-soluble film are divided into a plurality of compartments. Detergents having different functions are received in the plurality of compartments respectively. Dosage for washing the clothes does not need to be measured, various washing effects can be achieved by a single placement of the product, such that the product can be used conveniently.

However, the water-soluble unit-dose product is liquid, and therefore, the sealed package, when being stored or carried, may be broken easily, resulting in leakage of wrapped detergent components or leakage of active ingredients from a surface of the film, and therefore, stability of preservation of the products is reduced greatly. Furthermore, when preparing packaging materials to be served as the water-soluble film, the film needs to be stable to moisture in the air and durable to the detergents packaged inside the film. However, to meet the above requirements, it takes a long time to dissolve the film when the product is used at low temperatures, and sometimes, the film may not be completely dissolved, resulting in film residues remaining. Therefore, the film still needs to be improved.

SUMMARY OF THE DISCLOSURE

The present disclosure provides a one-piece combination detergent tablet made from combination of various compositions and a method of preparing the washing tablet. In the present disclosure, a high molecular water-soluble polymer is used as a base, each of a plurality of surfactant compositions having different properties is made into an independent composition body, and the base is compounded with a plurality of independent composition bodies. According to the method of the present disclosure, the plurality of independent composition bodies are placed on a water-soluble sheet on one plane. In this way, dosage does not need to be measured when being used, the one-piece washing tablet can be stably stored, a preservation period of the one-piece washing tablet is prolonged, and costs of transportation is reduced.

In a first aspect, the present disclosure provides a one-piece combination detergent tablet.

The one-piece combination detergent tablet includes a detergent composition body A, a color-care and anti-stain composition body B, and an antibacterial and softening composition body C.

The detergent composition body A includes:
an anionic surfactant A in a mass proportion of 16%-24%; a non-ionic surfactant A in a mass proportion of 5%-9%; a polymeric water-soluble film A in a mass proportion of 8%-15%;
an additive A in a mass proportion of 9%-12%; and water for the rest.

The color-care and anti-stain composition body B includes:
an anionic surfactant B in a mass proportion of 6%-12%; a non-ionic surfactant B in a mass proportion of 18%-24%; a polymeric water-soluble film B in a mass proportion of 7%-10%; an additive B in a mass proportion of 9%-14%; and water for the rest.

The antibacterial and softening composition body C includes:
a non-ionic surfactant C in a mass proportion of 16%-25%; a quaternary ammonium cationic surfactant in a mass proportion of 5%-10%; a polymeric water-soluble film C in a mass proportion of 12%-18%; an additive C in a mass proportion of 14%-22%; and water for the rest.

The total amount of the non-ionic surfactant A, the non-ionic surfactant B, and the non-ionic surfactant C in the one-piece combination detergent tablet is greater than the total amount of the anionic surfactant A and the anionic surfactant B.

Each of the polymeric water-soluble film A, the polymeric water-soluble film B, and the polymeric water-soluble film C is made from polyvinyl alcohol being compounded with polyvinyl pyrrolidone.

In the above embodiment, the anionic surfactant A is the main component of the detergent composition body A and is compounded with the non-ionic surfactant, such that an emulsifying performance of the slurry A is improved. In this way, when the slurry A is shaped into a tablet, a density of the slurry A is reduced, a size of the slurry A is increased, and the slurry A can be made into the tablet easily. Furthermore, the decontaminating effect of the detergent composition body A is improved.

Polyvinylpyrrolidone is added to the color-care and anti-stain composition body B to provide better colloidal protection for the system, such that the system may be shaped more easily and stably. Polyvinylpyrrolidone itself is polymeric and nonionic. A film may be formed on a surface of the fabric, such that a loss of dye molecules from colored fabrics may be reduced, and the amount of dye molecules stained onto white fabrics may be reduced. In this way, colors of the fabrics may be fixed, and color stringing may be prevented. At the same time, since polyvinylpyrrolidone and the non-ionic surfactant B are compounded with each other, the color-care and anti-stain composition body B prevents the stain from being redeposited. Further, the clothes may not be easily stained, or strength of the stains staining to the clothes may be reduced. Therefore, stains may be removed from the clothes more easily when the clothes are washed for a second time, such that the amount of detergent to be used for washing is reduced, saving resources and reducing costs.

Since the quaternary ammonium salt cationic surfactant is added to the antibacterial and softening composition body C, the antibacterial and softening composition body C enables the clothes to be antistatic and smoothing. At the same time, since the quaternary ammonium salt cationic surfactant is compounded with the non-ionic surfactant C, a cationic smoothing agent and microbicide components in the antibacterial and softening composition body C are prevented from being interfered by other ionic components, such that the antibacterial and softening composition body C is more stable. Further, when the one-piece combination detergent tablet is dissolved in water, the quaternary ammonium cationic surfactant is not easily affected by the anionic surfactant A, such that the antibacterial and softening composition body C provides a better bacterial inhibition and softening effect for the clothes.

In summary, each of the detergent composition body A, the color-care and anti-stain composition body B, and the antibacterial and softening composition body C is made into an individual detergent tablet, and three individual detergent tablets are made into the one-piece combination detergent tablet. In this way, each of the detergent composition body A, the color-care and anti-stain composition body B, and the antibacterial and softening composition body C is stored in an independent and stable system, various compositions do not affect each other, quality of the one-piece combination detergent tablet is improved, and a shelf life of the one-piece combination detergent tablet is extended. Further, detergent compositions may not be leaked during the one-piece combination detergent tablet is being stored or transported. A usage dosage does not need to be measured, the one-piece combination detergent tablet can be stably stored, the shelf life of the one-piece combination detergent tablet is extended, and transportation costs are reduced. In addition, the one-piece combination detergent tablet can be completely dissolved at low temperatures without leaving residues.

In the present disclosure, the amount of the anionic surfactant A is greater than the amount of the non-ionic surfactant A, such that the detergent composition body A can be shaped better. Further, the detergent composition body A serves as a backbone to tract the color-care and anti-stain composition body B and the antibacterial and softening composition body C, such that the one-piece combination detergent tablet can be shaped better. Moreover, by reasonably compounding various compositions, the total amount of the non-ionic surfactant in the one-piece combination detergent tablet is greater than the total amount of the anionic surfactant. In this way, when the one-piece combination detergent tablet is being in use, the influence, caused by the anionic surfactant, on the bacterial inhibition and softening effect of the quaternary ammonium cationic surfactant is reduced, and at the same time, the one-piece combination detergent tablet may be shaped more properly.

In some embodiments, the antibacterial and softening composition body C further includes a zwitter-ionic surfactant.

In the above embodiments, the density of the slurry body C is reduced, and a size of the slurry C is increased, such that the one-piece combination detergent tablet may be shaped more properly. Furthermore, the pH value of the system is adjusted to be maintained at a weakly acidic to neutral pH value. In this way, the zwitter-ionic surfactant has cationic properties, which does not easily affect the antistatic performance of the quaternary ammonium cationic surfactant, such that the one-piece combination detergent tablet has a better decontamination effect and a better softening effect.

In some embodiments, the zwitter-ionic surfactant is made by lauramidopropylamine oxide and cocamidopropyl betaine being compounded with each other in a mass ratio of 1:1.

In the above embodiments, the one-piece combination detergent tablet has the optimal shaping effect. Furthermore, the zwitter-ionic surfactant maintains the cationic property, and at the same time, the one-piece combination detergent tablet has a better detergent and softening effect.

In some embodiments, the antibacterial and softening composition body C further includes an alkyl guanidine-type microbicide, and the alkyl guanidine-type microbicide is one or more of: dodecyl guanidine acetate, poly(hexamethylene bisguanidine), poly(aminopropyl bisguanidine), chlorhexidine acetate, hydroxy phenyl ether.

In the above embodiments, the one-piece combination detergent tablet has a better bacterial inhibition effect.

In some embodiments, each of the anionic surfactant A and the anionic surfactant B comprises one or more of: sodium dodecyl benzene sulfonate, α-olefin sulfonate, sodium dodecyl sulfate, sodium dodecyl polyether sulfate, fatty acid methyl ethoxylate sulfonate sodium salt, secondary alkane-sulfonic acid salt, and fatty acid methyl ester sulfonate salt.

In some embodiments, the anionic surfactant A is made by sodium dodecyl sulfate, α-olefin sulfonate, fatty acid methyl ester sulfonate, sodium dodecyl polyether sulfate, and fatty acid methyl ester ethoxylate sulfate sodium salt being compounded with each other in a mass ratio of 5:2:1:1:1:1.

In some embodiments, the anionic surfactant B is made by sodium dodecyl sulfate, α-olefin sulfonate, fatty acid methyl ester sulfonate, sodium dodecyl polyether sulfate, fatty acid methyl ester ethoxylate sulfate sodium salt being compounded with each other in a mass ratio of 4:1:1:2:1.

In the above embodiments, sodium dodecyl sulfate, α-olefin sulfonate, fatty acid methyl ester sulfonate, sodium dodecyl polyether sulfate, and fatty acid methyl ester ethoxy sulfonate sodium salt are compounded with each other in a specific mass ratio, and therefore, the detergent effect of the detergent composition body A is further improved, and the one-piece combination detergent tablet can be shaped stably in the case that the total amount of the non-ionic surfactants in the one-piece combination detergent tablet is maximized.

In some embodiments, each of the non-ionic surfactant A, the non-ionic surfactant B, and the non-ionic surfactant C comprises one or more of: fatty alcohol polyoxy ethylene ether, cocamide, FMEE surfactants, and alkyl glycosides.

In some embodiments, the non-ionic surfactant A is made by fatty alcohol polyoxyethylene ether, FMEE surfactant, and cocamide being compounded with each other in a mass ratio of 3:2:2.

The non-ionic surfactant B is made by alkyl glycosides, FMEE surfactant, and cocamide being compounded with each other in a mass ratio of 2:2:1.

The non-ionic surfactant C is made by fatty alcohol polyoxyethylene ether, FMEE surfactant, cocamide, and alkyl glycoside being compounded with each other in a mass ratio of 1:1:3:4.

In the above embodiments, the decontamination effect of the one-piece combination detergent tablet is improved, and stains are less likely to be re-deposited on the clothes.

Furthermore, the clothes may be softer.

In some embodiments, the quaternary ammonium cationic surfactant comprises one or more of: dialkyl dimethyl ammonium chloride, dialkyl imidazoline salts, dialkyl amido quaternary ammonium salts, bis(ethyl palmitate)-based hydroxyethyl methyl ammonium sulphate.

In the above embodiments, the softening effect of the one-piece combination detergent tablet is improved, such that the clothes, after being washed, may be soft and comfortable.

In a second aspect, the present disclosure provides a method of preparing the one-piece combination detergent tablet.

The method of preparing the one-piece combination detergent tablet includes following operations.

In an operation 1, the detergent composition body A is prepared.

(1) The polymeric water-soluble film A is added to deionized water to form a component A, while adding, the component A is heated for dissolving the polymeric water-soluble film A; and a premixed material A is obtained.

(2) The anionic surfactant A and the non-ionic surfactant A are added into the premixed material A; after the anionic surfactant A, the non-ionic surfactant A, and the premixed material A are mixed uniformly, the additive A is further added to obtain a mixture, the mixture is stirred, and a slurry A is obtained.

In an operation 2, the color-care and anti-stain composition body B is prepared.

(1) The polymeric water-soluble film B is added into deionized water to form a component B, the component B is heated for dissolving the polymeric water-soluble film B, and a premixed material B is obtained.

(2) The anionic surfactant B and the non-ionic surfactant B are added into the premixed material B; after the anionic surfactant B, the non-ionic surfactant B, and the premixed material B are mixed uniformly, the additive B is further added to obtain a mixture; the mixture is stirred evenly; and a slurry B is obtained.

In an operation 3, the antibacterial and softening composition body C is prepared.

(1) The polymeric water-soluble film C is added into deionized water to form a component C, the component C is heated for dissolving the polymeric water-soluble film C, and a premixed material C is obtained.

(2) The non-ionic surfactant C and the quaternary ammonium cationic surfactant are added into the premixed material C; after the non-ionic surfactant C, the quaternary ammonium cationic surfactant, and the premixed material C are mixed uniformly, the additive C is further added; and a slurry C is obtained.

In an operation 4, the one-piece combination detergent tablet is prepared.

Each of the slurry A, the slurry B, and the slurry C is conveyed into a fixed manifold conveying pipe respectively to reach a heated rotatable cylinder having slurry grooves isolated from each other; water is removed from each of the slurry A, the slurry B, and the slurry C, and each of the water-removed slurry A, the water-removed slurry B, and the water-removed slurry C is shaped into a sheet form having respective compositions for detergency, and the one-piece combination detergent tablet is obtained.

By performing the above method to prepare the one-piece combination detergent tablet, the one-piece combination detergent tablet can be better shaped. In addition, the decontamination effect, the color fixation effect, the stain resistance effect, and bacterial inhibition and softening effect of the one-piece combination detergent tablet are improved.

According to the present disclosure, following technical effects can be achieved:

1. In the present disclosure, firstly, each of the detergent composition body A, the color-care and anti-stain composition body B, and the antibacterial and softening composition body C is made into an individual detergent tablet. Subsequently, the three detergent tablets are made into a one-piece combination detergent tablet. Therefore, each of the detergent composition body A, the color-care and anti-stain composition body B, and the antibacterial and softening composition body C is stored in a separate and stable system. In this way, performances of various components do not affect each other, quality of performance of the product is improved, and the shelf-life of the product is extended. In addition, when the product is stored and transported, leakage of detergent components can be prevented, the usage dosage does not need to be measured, the product can be stably stored, the shelf life of the product is extended, and transportation costs are reduced. Furthermore, the product can be dissolved completely at low temperatures, without leaving residues.

2. In the present disclosure, the amount of the anionic surfactant A is greater than the amount of the nonionic surfactant A, such that the detergent composition body A is shaped better. The detergent composition body A serves as a skeleton to tract the color-care and anti-stain composition body B and the antibacterial and softening composition body C, such that the one-piece combination detergent tablet can be shaped better. Moreover, the various components are compounded reasonably, enabling the total amount of the nonionic surfactants to be greater than the total amount of the anionic surfactants in the one-piece combination detergent tablet. In this way, while the one-piece combination detergent tablet is in use, the influence, caused by the anionic surfactants, on the antibacterial and softening effect of alkyl guanidine fungicides and quaternary ammonium cationic surfactants may be reduced, and the one-piece combination detergent tablet can be shaped properly.

3. By adding the zwitterionic surfactant into the antibacterial and softening composition body C, the shaping effect of the one-piece combination detergent tablet can be improved, and the pH value of the system is adjusted to be maintained at a weakly acidic to neutral pH value. In this way, the zwitterionic ionic surfactant exhibits cationic properties, such that the antistatic performance of the quaternary ammonium salt cationic surfactant may not be affected, and the antibacterial performance of the strong cationic antibacterial agent may not be affected.

DETAILED DESCRIPTION

The present disclosure will be described in further detail below by referring to the embodiments.

Embodiments 1-2

In the present embodiment, a one-piece combination detergent tablet is provided and includes a detergent composition body A, a color-care and anti-stain composition body B, and an antibacterial and softening composition body C.

The detergent composition body A includes the following components:

an anionic surfactant A; a non-ionic surfactant A; a polymeric water-soluble film A; an additive A; and water.

The color-care and anti-stain composition body B includes the following components:

an anionic surfactant B; a nonionic surfactant B; a polymeric water-soluble film B; an additive B; and water.

The antibacterial and softening composition body C includes the following components:

a non-ionic surfactant C; a quaternary ammonium cationic surfactant; a polymeric water-soluble film C; an additive C; and water.

The total amount of the non-ionic surfactants in the one-piece combination detergent tablet is greater than the total amount of the anionic surfactants.

Each of the polymeric water-soluble film A, the polymeric water-soluble film B, and the polymeric water-soluble film C is made from polyvinyl alcohol being compounded with polyvinyl pyrrolidone.

The polyvinyl alcohol has a degree of polymerization of 1800, a molecular weight of 80,000 MW, and an alkalization degree of 85%-90%. A hydrophobically modified acrylic polymer is used as a dispersant. Dimethyl 1,4-benzenedicarboxylate polymer with 1,2-propanediol, diester with α-methyl-ω-hydroxypol or water soluble polyester is used as a stain-removing polymer. Sokalan HP 20 is polyethylene imine ethoxylate. A modified vinyl pyrrolidone/vinylimidazole co-polymer is used as a high-performance anti-colour stringing detergent.

Embodiment 3

The amount of each component for the Embodiment 3 is different from that for the Embodiment 1. That is, in the present embodiment, the anionic surfactant A is made by sodium dodecyl sulfate, α-olefin sulfonate, fatty acid methyl ester sulfonate, sodium dodecyl polyether sulfate, and fatty acid methyl ester ethoxylate sulfate sodium salt being compounded with each other in a mass ratio of 5:2:1:1:1.

The anionic surfactant B is made by sodium dodecyl sulfate, α-olefin sulfonate, fatty acid methyl ester sulfonate, sodium dodecyl polyether sulfate, sodium salt of fatty acid methyl ester ethoxylate sulfate being compounded with each other in a mass ratio of 4:1:1:2:1.

The non-ionic surfactant A is made by fatty alcohol polyoxyethylene ether, FMEE surfactant, and cocamide being compounded with each other in a mass ratio of 3:2:2.

The non-ionic surfactant B is made by alkyl glycosides, FMEE surfactant, and cocamide being compounded with each other in a mass ratio of 2:2:1.

The non-ionic surfactant C is made by fatty alcohol polyoxyethylene ether, FMEE surfactant, cocamide, and alkyl glycoside being compounded with each other in a mass ratio of 1:1:3:4.

A method of preparing the one-piece combination detergent tablet includes the following operations.

In an operation 1, the detergent composition body A is prepared.

(1) The polymeric water-soluble film A is added to deionized water to form a material component, while adding, the material component is being stirred and being heated to reach 85° C. Heating is then turned off, and the material component is maintained at 85° C. constantly for 30 minutes until the material component is completely dissolved and swelled evenly, such that a premixed material A is obtained.

(2) The anionic surfactant A and the non-ionic surfactant A are added into the premixed material A. After the anionic surfactant A, the non-ionic surfactant A, and the premixed material A are mixed uniformly, the additive A is further added to obtain a mixture. PH of the mixture is adjusted to be ≤9.5, viscosity of the mixture is 25000 mPa·s, and at this time, a temperature of the mixture is 65° C., such that a slurry A is obtained.

In an operation 2, the color-care and anti-stain composition body B is prepared.

(1) The polymeric water-soluble film B is added into deionized water to form a material component, while adding, the material component is being stirred and being heated to reach 90° C. Heating is then turned off, and the material component is maintained at 90° C. constantly for 30 minutes until the material component is completely dissolved and swelled evenly, such that a premixed material B is obtained.

(2) The anionic surfactant B and the non-ionic surfactant B are added into the premixed material B. After the anionic surfactant B, the non-ionic surfactant B, and the premixed material B are mixed uniformly, the additive B is further added to obtain a mixture. PH of the mixture is adjusted to be ≤8.2, viscosity of the mixture is 45000 mPa·s, and at this time, a temperature of the mixture is 55° C., such that a slurry B is obtained.

In an operation 3, the antibacterial and softening composition body C is prepared.

(1) The polymeric water-soluble film C is added into deionized water to form a material component, while adding, the material component is being stirred and being heated to reach 85° C. Heating is then turned off, and the material component is maintained at 85° C. constantly for 30 minutes until the material component is completely dissolved and swelled evenly, such that a premixed material C is obtained.

(2) The non-ionic surfactant C and the quaternary ammonium cationic surfactant are added into the premixed material C. After the non-ionic surfactant C, the quaternary ammonium cationic surfactant, and the premixed material C are mixed uniformly, the additive C is further added to obtain a mixture. PH of the mixture is adjusted to be in a range from 5.0 to 7.0, viscosity of the mixture is 40000 mPa·s, and at this time, a temperature of the mixture is 50° C., such that a slurry C is obtained.

In an operation 4, the one-piece combination detergent tablet is prepared.

Each of the slurry A, the slurry B, and the slurry C is conveyed into a fixed manifold conveying pipe respectively to reach a heated rotatable cylinder having slurry grooves isolated from each other. Water is removed from each of the slurries, and each of the slurries is shaped into a sheet form having the respective compositions for washing. That is, the one-piece combination detergent tablet is obtained.

The color-care and anti-stain composition body B and the antibacterial and softening composition body Care disposed on two sides of the detergent composition body A, respectively.

Compositions and dosages of the compositions in the Embodiments 1-3 are shown in Table 1, and the dosages in Table 1 take kg as the unit.

TABLE 1

|  |  |  | Embodiment 1 | Embodiment 2 | Embodiment 3 |
|---|---|---|---|---|---|
| detergent composition body A | Anionic surfactant A | sodium dodecyl sulfate | 3 | 8 | 10 |
|  |  | α-olefin sulfonate | 5 | 6 | 4 |
|  |  | Fatty acid methyl ester sulfonate | 4 | 2 | 2 |
|  |  | Sodium dodecyl polyether sulfate | 2 | 4 | 2 |
|  |  | Fatty acid methyl ester ethoxy sulfonate sodium | 2 | 4 | 2 |
|  |  | Total | 16 | 24 | 20 |
|  | Non-ionic surfactant A | Fatty alcohol polyoxyethylene ether | 2 | 4 | 3 |
|  |  | FMEE surfactant | 2 | 3 | 2 |
|  |  | cocamide | 1 | 2 | 2 |
|  |  | Total | 5 | 9 | 7 |
|  | Polymeric water-soluble film A | polyvinyl alcohol | 4 | 10 | 7 |
|  |  | polyvinylpyrrolidone | 4 | 5 | 3 |
|  |  | Total | 8 | 15 | 10 |
|  | Additive A | hydrophobically modified acrylic polymer | 3 | 3 | 3 |
|  |  | glycerol | 3 | 3 | 3 |
|  |  | sodium citrate | 1 | 1 | 1 |
|  |  | Glutamic acid Tetrasodium diacetate salt | 1 | 1 | 1 |
|  |  | Hydroxyethyl cellulose | 0.5 | 0.5 | 0.5 |
|  |  | Daily-use flavorings | 1 | 1 | 1 |
|  |  | Microencapsulated flavorings | 0.5 | 0.5 | 0.5 |
|  |  | Hydroxyphenyl methyl ester | 0.1 | 0.1 | 0.1 |
|  |  | reactive dye | 0.1 | 0.1 | 0.1 |
|  |  | Total | 10.2 | 10.2 | 10.2 |
|  |  | water | 60.8 | 41.8 | 52.8 |
|  | Total |  | 100 | 100 | 100 |
| color-care and anti-stain composition body B | Anionic surfactant B | sodium dodecyl sulfate | 1 | 3 | 4 |
|  |  | α-olefin sulfonate | 2 | 2 | 1 |
|  |  | Fatty acid methyl ester sulfonate | 1 | 4 | 1 |
|  |  | Sodium dodecyl polyether sulfate | 1 | 2 | 2 |
|  |  | Fatty acid methyl ester ethoxy sulfonate sodium salt | 1 | 1 | 1 |
|  |  | Total | 6 | 12 | 9 |
|  | Non-ionic surfactant B | alkyl glycoside | 6 | 8 | 8 |
|  |  | FMEE surfactant | 8 | 6 | 8 |
|  |  | cocamide | 4 | 10 | 4 |
|  |  | Total | 18 | 24 | 20 |
|  | Polymeric water-soluble film B | polyvinyl alcohol | 5 | 6 | 7 |
|  |  | polyvinylpyrrolidone | 2 | 4 | 2 |
|  |  | Total | 7 | 10 | 9 |
|  | Additive B | stain-removing polymer | 1 | 1 | 1 |
|  |  | Sokalan HP 20 | 3 | 3 | 3 |
|  |  | modified vinyl pyrrolidone/vinylimidazole co-polymer | 0.5 | 0.5 | 0.5 |
|  |  | Glycerol | 3 | 3 | 3 |
|  |  | sodium citrate | 1 | 1 | 1 |
|  |  | sodium iminodisuccinate | 0.5 | 0.5 | 0.5 |
|  |  | Carboxymethyl cellulose | 0.5 | 0.5 | 0.5 |
|  |  | Daily-use flavorings | 1 | 1 | 1 |
|  |  | hydroxyphenyl ether | 0.3 | 0.3 | 0.3 |
|  |  | Reactive dye | 0.1 | 0.1 | 0.1 |
|  |  | Total | 10.9 | 10.9 | 10.9 |
|  |  | Water | 58.1 | 43.1 | 51.1 |
|  | Total |  | 100 | 100 | 100 |

TABLE 1-continued

|  |  |  | Embodiment 1 | Embodiment 2 | Embodiment 3 |
|---|---|---|---|---|---|
| antibacterial and softening composition body C | Non-ionic surfactant C | Fatty alcohol polyoxyethylene ether | 3 | 5 | 2 |
|  |  | FMEE surfactant | 3 | 5 | 2 |
|  |  | cocamide | 4 | 7 | 6 |
|  |  | alkyl glycoside | 6 | 8 | 8 |
|  |  | Total | 16 | 25 | 18 |
|  | Cationic surfactant | Ethyl dipalmitate hydroxyethyl methylammonium sulfate | 3 | 5 | 5 |
|  |  | Sokalan HP 20 | 2 | 5 | 3 |
|  |  | Total | 5 | 10 | 8 |
|  | Polymeric water-soluble film C | polyvinyl alcohol | 6 | 10 | 9 |
|  |  | polyvinylpyrrolidone | 6 | 8 | 6 |
|  |  | Total | 12 | 18 | 15 |
|  | Additive C | stain-removing polymer | 0.5 | 0.5 | 0.5 |
|  |  | Glycerol | 3 | 3 | 3 |
|  |  | sodium citrate | 1.5 | 1.5 | 1.5 |
|  |  | citric acid | 0.5 | 0.5 | 0.5 |
|  |  | Hydroxyethyl cellulose | 0.5 | 0.5 | 0.5 |
|  |  | pea starch | 10 | 10 | 10 |
|  |  | Bentonite clay | 5 | 5 | 5 |
|  |  | Daily-use flavorings | 1 | 1 | 1 |
|  |  | Total | 22 | 22 | 22 |
|  | Water |  | 45 | 25 | 37 |
|  | Total |  | 100 | 100 | 100 |

Embodiment 4

Compared to the Embodiment 3, in the present embodiment, the antibacterial and softening composition body C further includes a zwitter-ionic surfactant. The zwitter-ionic surfactant is made by lauramidopropylamine oxide and cocamidopropyl betaine being compounded with each other in a mass ratio of 1:1.

Embodiment 5

Compared to the Embodiment 3, in the present embodiment, the antibacterial and softening composition body C further includes an alkyl guanidine-type microbicide. The alkyl guanidine-type microbicide is made by poly(aminopropylidenebiguanide) and chlorhexidine acetate being compounded with each other in a mass ratio of 1:2.

Control Experiment 1

Compared to the Embodiment 3, in the present control experiment, the amount of the anionic surfactant A is less than the amount of the non-ionic surfactant A. That is, the amount of the anionic surfactant A is 7 kg, and the amount of the non-ionic surfactant A is 20 kg.

Control Experiment 2

Compared to the Embodiment 3, in the present control experiment, the amount of the non-ionic surfactant B is less than the amount of the anionic surfactant B. That is, the amount of the non-ionic surfactant B is 9 kg, and the amount of the anionic surfactant B is 20 kg.

Control Experiment 3

Compared to the Embodiment 3, in the present control experiment, the amount of the non-ionic surfactant C is less than the amount of the quaternary ammonium cationic surfactant. That is, the amount of the non-ionic surfactant C is 8 kg, and the amount of the quaternary ammonium cationic surfactant is 18 kg.

Control Experiment 4

Compared to the Embodiment 3, in the present control experiment, the anionic surfactant A is made by sodium dodecyl sulfate and α-olefin sulfonate being compounded with each other in a mass ratio of 5:5. The anionic surfactant B is made by fatty acid methyl ester sulfonate and sodium dodecyl polyether sulfate being compounded with each other in a mass ratio of 5:4.

Control Experiment 5

Compared to the Embodiment 3, in the present control experiment, the non-ionic surfactant A is made by fatty alcohol polyoxyethylene ether and cocamide being compounded with each other in a mass ratio of 3:4. The non-ionic surfactant B is made by fatty alcohol polyoxyethylene ether and cocamide being compounded with each other in a mass ratio of 4:1. The non-ionic surfactant C is made by fatty alcohol polyoxyethylene ether, FMEE surfactant, and alkyl glycoside being compounded with each other in a mass ratio of 3:3:3.

Experiment 1

10 g of the one-piece combination detergent tablet prepared in each of the above Embodiments and in each of the control experiments is respectively added to 100 g of water to form 10 detergent solutions. A plurality of uniformly shaped and sized carbon-black oil-stained cloth JB-01, a plurality of protein-stained cloth JB-02, and a plurality of sebum-stained cloth JB-03 are prepared by performing cloth preparation methods specified in the GB/T13174-2008 "Determination of detergent performance and cyclic washing performance of cloth-washing materials". Further, a stain removal value of each one-piece combination detergent tablet prepared in each of the above Embodiments and in each of the control experiments is determined in accordance with the GB/T13174-2008 "Determination of detergent performance and cyclic washing performance of cloth-washing materials".

Experiment 2

In the present experiment, a bacterial inhibition rate (%) of the one-piece combination detergent tablet prepared in each of the above Embodiments and in each of the control experiments is determined by following the method of testing the microbial inhibition effect of anti-microbial daily chemical products (quantification of suspensions) specified in the Appendix 7.3 of the QB/T2738-2012 "Evaluation method of antimicrobial and microbial inhibition for daily chemical products". The bacterial inhibition rate of ≥50% indicates that the one-piece combination detergent tablet has a bacterial inhibition effect. The bacterial inhibition rate of ≥90% indicates that the bacterial inhibition effect of the one-piece combination detergent tablet is strong.

Results of the above experiments are shown in Table 2

TABLE 2

| | Decontamination performance | | | bacterial inhibition performance | | Whether the one-piece combination detergent tablet is shaped |
|---|---|---|---|---|---|---|
| | JB-01 | JB-02 | JB-03 | E. coli inhibition rate (%) | Staphylococcus aureus inhibition rate (%) | |
| Embodiment 1 | 25.42 | 6.35 | 10.23 | 98.13 | 98.25 | YES |
| Embodiment 2 | 26.08 | 6.49 | 10.45 | 98.56 | 98.47 | YES |
| Embodiment 3 | 26.59 | 6.50 | 10.52 | 98.64 | 98.82 | YES |
| Embodiment 4 | 28.30 | 7.94 | 11.90 | 98.70 | 98.92 | YES |
| Embodiment 5 | 25.85 | 6.68 | 10.68 | 99.98 | 99.93 | YES |
| Embodiment 1 | 25.16 | 5.88 | 9.84 | 95.12 | 96.36 | NO |
| Embodiment 2 | 24.22 | 4.56 | 8.63 | 89.24 | 87.49 | YES |
| Embodiment 3 | 24.57 | 4.72 | 8.79 | 88.65 | 88.51 | YES |
| Embodiment 4 | 22.08 | 4.03 | 8.14 | 90.22 | 93.04 | YES |
| Control experiment 5 | 23.41 | 4.25 | 8.36 | 91.08 | 94.85 | YES |
| Detergent in the market | 25.13 | 6.11 | 9.82 | 97.54 | 97.26 | — |

According to comparison between the control experiment 1 and the embodiment 3 in Table 2, the amount of the anionic surfactant A in the control experiment 1 is less than the amount of the non-ionic surfactant A in the control experiment 1, and the one-piece combination detergent tablet cannot be stably shaped. Due to the fact that the amount of the anionic surfactant A is less than the amount of the non-ionic surfactant A, the total amount of the non-ionic surfactant in the one-piece combination detergent tablet is larger, such that the one-piece combination detergent tablet to cannot be shaped properly.

According to comparison between the control experiment 2 and the embodiment 3 in Table 2, the amount of the non-ionic surfactant B in the control experiment 2 is less than the amount of the anionic surfactant B in the control experiment 2. The decontamination performance of the control experiment 2 is not as good as that of the embodiment 3, and the bacterial inhibition performance of the control experiment 2 is not as good as that of the embodiment 3. Due to the fact that the total amount of the non-ionic surfactant in the one-piece combination detergent tablet is less, the anionic surfactant B and the quaternary ammonium salt cationic surfactant interferes with each other, such that the decontamination performance and the bacterial inhibition performance of the one-piece combination detergent tablet are reduced.

According to comparison between the control experiment 3 and the embodiment 3 in Table 2, the amount of the nonionic surfactant C in the control experiment 3 is less than the amount of the quaternary ammonium cationic surfactant in the control experiment 3, the detergent performance of the control experiment 3 is not as good as that of the embodiment 3, and the bacterial inhibition performance of the control experiment 3 is less than that of the embodiment 3. Due to the fact that the amount of the total non-ionic surfactant in the one-piece combination detergent tablet is less, the quaternary ammonium cationic surfactant, the anionic surfactant A, and the anionic surfactant B may interfere with each other, such that the detergent performance and the bacterial inhibition performance of the one-piece combination detergent tablet is reduced.

In summary, only by compounding the various compositions reasonably, the total amount of the non-ionic surfactant in the one-piece combination detergent tablet is greater than the total amount of the anionic surfactant in the one-piece combination detergent tablet. In this way, when the one-piece combination detergent tablet is being in use, the influence, caused by the anionic surfactant, on the antimicrobial and softening effect of the quaternary ammonium cationic surfactant is reduced, and at the same time, the one-piece combination detergent tablet can be shaped properly.

According to comparison between the control experiment 4 and the embodiment 3 in Table 2, the anionic surfactant A in the control experiment 4 is made by sodium dodecyl sulfate and α-olefin sulfonate being compounded with each other. The anionic surfactant B in the control experiment 4 is made by fatty acid methyl ester sulfonate and sodium dodecyl polyether sulfate being compounded with each other. The decontamination performance and the bacterial inhibition performance of the control experiment 4 is less than that of the embodiment 3, indicating that the technical effect of the present application cannot be achieved if the anionic surfactant A and the anionic surfactant B are made by compounding compositions randomly.

According to comparison between the control experiment 5 and the embodiment 3 in Table 2, the non-ionic surfactant A in the control experiment 5 is made by fatty alcohol polyoxyethylene ether and cocoamide being compounded with each other. The non-ionic surfactant B in the control experiment 5 is made by fatty alcohol polyoxyethylene ether and cocoamide being compounded with each other. The non-ionic surfactant C in the control experiment 5 is made by fatty alcohol polyoxyethylene ether, FMEE surfactant, and alkyl glucoside being compounded with each other. In this case, the decontamination performance and the bacterial inhibition performance of the control experiment 5 is less than that of the embodiment 3, indicating that the technical effect of the present application cannot be achieved if the non-ionic surfactant A, the non-ionic surfactant B, and the non-ionic surfactant C are made by compounding compositions randomly.

According to comparison between the embodiment 4 and the embodiment 3 in Table 2, the one-piece combination detergent tablet further includes the zwitter-ionic surfactant, and the zwitter-ionic surfactant is made by lauramidopropylamine oxide and cocoamidopropyl betaine being compounded with each other in the mass ratio of 1:1, and in this case, the decontamination performance of the embodiment 4 is greater than that of the embodiment 3. It indicates that when the zwitter-ionic surfactant is added into the one-piece combination detergent tablet, the decontamination performance of the one-piece combination detergent tablet can be improved.

According to comparison between the embodiment 5 and the embodiment 3 in Table 2, the one-piece combination detergent tablet further includes the alkyl guanidine-type microbicide, and the alkyl guanidine-type microbicide is made by poly(aminopropylbiguanide) and chlorhexidine acetate being compounded with each other in a mass ratio of 1:2, and in this case, the bacterial inhibition performance of the embodiment 5 is greater than that of the embodiment 3. It indicates that when the alkyl guanidine-type microbicide is added to the one-piece combination detergent tablet, the bacterial inhibition performance of the one-piece combination detergent tablet is improved.

The above are the preferred embodiments of the present disclosure but does not limit the scope of the present disclosure. Therefore, any equivalent changes made in accordance with the structure, the shape and principles of the present disclosure shall be covered by the scope of the present disclosure.

The invention claimed is:

1. A one-piece combination detergent tablet, comprising: a detergent composition body A, a color-care and anti-stain composition body B, and an antibacterial and softening composition body C; wherein the detergent composition body A, the color-care and anti-stain composition body B, and the antibacterial and softening composition body C are independently arranged from each other and are arranged on a same surface of a water-soluble sheet;

wherein the detergent composition body A comprises: an anionic surfactant A in a mass proportion of 16%-24%; a non-ionic surfactant A in a mass proportion of 5%-9%; a polymeric water-soluble film A in a mass proportion of 8%-15%; an additive A in a mass proportion of 9%-12%; and water for the rest;

the color-care and anti-stain composition body B comprises: an anionic surfactant B in a mass proportion of 6%-12%; a non-ionic surfactant B in a mass proportion of 18%-24%; a polymeric water-soluble film B in a mass proportion of 7%-10%; an additive B in a mass proportion of 9%-14%; and water for the rest;

the antibacterial and softening composition body C comprises: a non-ionic surfactant C in a mass proportion of 16%-25%; a quaternary ammonium cationic surfactant in a mass proportion of 5%-10%; a polymeric water-soluble film C in a mass proportion of 12%-18%; an additive C in a mass proportion of 14%-22%; and water for the rest;

the total amount of the non-ionic surfactant A, the non-ionic surfactant B, and the non-ionic surfactant C in the one-piece combination detergent tablet is greater than the total amount of the anionic surfactant A and the anionic surfactant B; and each of the polymeric water-soluble film A, the polymeric water-soluble film B, and the polymeric water-soluble film C is made from polyvinyl alcohol being compounded with polyvinyl pyrrolidone;

the anionic surfactant A is made by sodium dodecyl sulfate, α-olefin sulfonate, fatty acid methyl ester sulfonate, sodium dodecyl polyether sulfate, and fatty acid methyl ester ethoxylate sulfate sodium salt being compounded with each other in a mass ratio of 5:2:1:1:1;

the anionic surfactant B is made by sodium dodecyl sulfate, α-olefin sulfonate, fatty acid methyl ester sulfonate, sodium dodecyl polyether sulfate, fatty acid methyl ester ethoxylate sulfate sodium salt being compounded with each other in a mass ratio of 4:1:1:2:1;

the non-ionic surfactant A is made by fatty alcohol polyoxyethylene ether, FMEE surfactant, and cocamide being compounded with each other; the non-ionic surfactant B is made by alkyl glycosides, FMEE surfactant, and cocamide being compounded with each other; and the non-ionic surfactant C is made by fatty alcohol polyoxyethylene ether, FMEE surfactant, cocamide, and alkyl glycoside being compounded with each other.

2. The one-piece combination detergent tablet according to claim 1, wherein, the non-ionic surfactant A is made by fatty alcohol polyoxyethylene ether, FMEE surfactant, and cocamide being compounded with each other in a mass ratio of 3:2:2;

the non-ionic surfactant B is made by alkyl glycosides, FMEE surfactant, and cocamide being compounded with each other in a mass ratio of 2:2:1; and the non-ionic surfactant C is made by fatty alcohol polyoxyethylene ether, FMEE surfactant, cocamide, and alkyl glycoside being compounded with each other in a mass ratio of 1:1:3:4.

3. The one-piece combination detergent tablet according to claim 1, wherein, the quaternary ammonium cationic surfactant comprises one or more of: dialkyl dimethyl ammonium chloride, dialkyl imidazoline salt, dialkyl amido quaternary ammonium salt, and ethyl bis(2-palmitate)-based hydroxyethyl methyl ammonium sulfate.

4. A method of preparing the one-piece combination detergent tablet according to claim 1, the method comprising:

an operation 1 of preparing the detergent composition body A, wherein, (1) the polymeric water-soluble film A is added to deionized water to form a component A, while adding, the component A is heated for dissolving the polymeric water-soluble film A; and a premixed material A is obtained; and (2) the anionic surfactant A and the non-ionic surfactant A are added into the premixed material A; after the anionic surfactant A, the non-ionic surfactant A, and the premixed material A are mixed uniformly, the additive A is further added to obtain a mixture, the mixture is stirred, and a slurry A is obtained;

an operation 2 of preparing the color-care and anti-stain composition body B, wherein (1) the polymeric water-soluble film B is added into deionized water to form a component B, the component B is heated for dissolving the polymeric water-soluble film B, and a premixed material B is obtained; and (2) the anionic surfactant B and the non-ionic surfactant B are added into the premixed material B; after the anionic surfactant B, the non-ionic surfactant B, and the premixed material B are mixed uniformly, the additive B is further added to obtain a mixture; the mixture is stirred evenly; and a slurry B is obtained;

an operation 3 of preparing the antibacterial and softening composition body C, wherein (1) the polymeric water-soluble film C is added into deionized water to form a component C, the component C is heated for dissolving the polymeric water-soluble film C, and a premixed material C is obtained; and (2) the non-ionic surfactant C and the quaternary ammonium cationic surfactant are added into the premixed material C; after the non-ionic surfactant C, the quaternary ammonium cationic surfactant, and the premixed material C are mixed uniformly, the additive C is further added; and a slurry C is obtained;

an operation 4 of preparing the one-piece combination detergent tablet;

wherein each of the slurry A, the slurry B, and the slurry C is conveyed into a fixed manifold conveying pipe respectively to reach a heated rotatable cylinder having slurry grooves isolated from each other; water is removed from each of the slurry A, the slurry B, and the slurry C, and each of the water-removed slurry A, the water-removed slurry B, and the water-removed slurry C is shaped into a sheet form having respective compositions for detergency, and the one-piece combination detergent tablet is obtained.

5. A one-piece combination detergent tablet, comprising a detergent composition body A, a color-care and anti-stain composition body B, and an antibacterial and softening composition body C; wherein the detergent composition body A, the color-care and anti-stain composition body B, and the antibacterial and softening composition body C are independently arranged from each other and are arranged on a same surface of a water-soluble sheet;

wherein the detergent composition body A comprises: an anionic surfactant A in a mass proportion of 16%-24%; a non-ionic surfactant A in a mass proportion of 5%-9%; a polymeric water-soluble film A in a mass proportion of 8%-15%; an additive A in a mass proportion of 9%-12%; and water for the rest;

the color-care and anti-stain composition body B comprises: an anionic surfactant B in a mass proportion of 6%-12%; a non-ionic surfactant B in a mass proportion of 18%-24%; a polymeric water-soluble film B in a mass proportion of 7%-10%; an additive B in a mass proportion of 9%-14%; and water for the rest;

the antibacterial and softening composition body C comprises: a non-ionic surfactant C in a mass proportion of 16%-25%; a quaternary ammonium cationic surfactant in a mass proportion of 5%-10%; a polymeric water-soluble film C in a mass proportion of 12%-18%; an additive C in a mass proportion of 14%-22%; an alkyl guanidine-type microbicide; and water for the rest; wherein the alkyl guanidine-type microbicide is one or more of: dodecyl guanidine acetate, poly(hexamethylene bisguanidine), poly(aminopropyl bisguanidine), chlorhexidine acetate, hydroxy phenyl ether;

the total amount of the non-ionic surfactant A, the non-ionic surfactant B, and the non-ionic surfactant C in the one-piece combination detergent tablet is greater than the total amount of the anionic surfactant A and the anionic surfactant B;

each of the polymeric water-soluble film A, the polymeric water-soluble film B, and the polymeric water-soluble film C is made from polyvinyl alcohol being compounded with polyvinyl pyrrolidone;

the anionic surfactant A is made by sodium dodecyl sulfate, α-olefin sulfonate, fatty acid methyl ester sulfonate, sodium dodecyl polyether sulfate, and fatty acid methyl ester ethoxylate sulfate sodium salt being compounded with each other in a mass ratio of 5:2:1:1:1;

the anionic surfactant B is made by sodium dodecyl sulfate, α-olefin sulfonate, fatty acid methyl ester sulfonate, sodium dodecyl polyether sulfate, fatty acid methyl ester ethoxylate sulfate sodium salt being compounded with each other in a mass ratio of 4:1:1:2:1;

the non-ionic surfactant A is made by fatty alcohol polyoxyethylene ether, FMEE surfactant, and cocamide being compounded with each other; the non-ionic surfactant B is made by alkyl glycosides, FMEE surfactant, and cocamide being compounded with each other; and the non-ionic surfactant C is made by fatty alcohol polyoxyethylene ether, FMEE surfactant, cocamide, and alkyl glycoside being compounded with each other.

* * * * *